Oct. 9, 1951     W. M. BUSHNELL     2,570,520
TOENAILED ASSEMBLY AND FITTING THEREFOR
Filed May 4, 1948
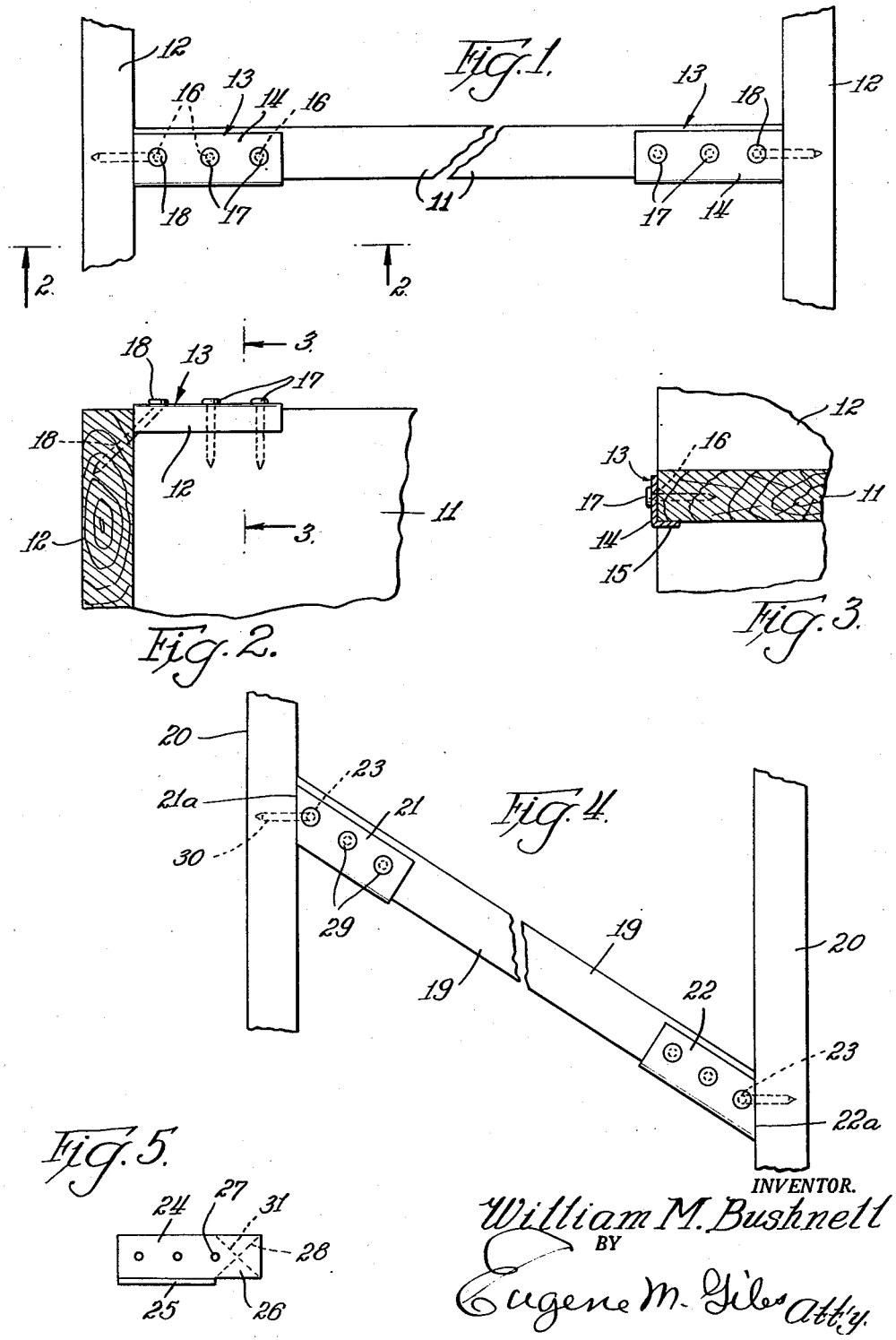

Patented Oct. 9, 1951

2,570,520

UNITED STATES PATENT OFFICE 2,570,520

TOENAILED ASSEMBLY AND FITTING THEREFOR

William M. Bushnell, Chicago, Ill.

Application May 4, 1948, Serial No. 24,981

4 Claims. (Cl. 20—92)

My invention relates to an assembly wherein a member, for example a board, is secured edgewise by toe-nailing to the side of another member or board and has reference more particularly to a fitting whereby the toe-nailing is more effectively accomplished.

Oftentimes in carpentry and similar work it is desirable in securing one member, endwise or edgewise to the side of another member, to toenail the members together by driving nails angularly through the corners of the endwise or edgewise member and into the side of the other member.

However, in ordinary toe-nailing, unless the nail is carefully started a substantial distance from the plane of the edge which is to be abutted against the side of the other member, a secure fastening is not obtainable and even then the corner through which the nail is driven oftentimes splits and the connection is unsightly and insecure.

Moreover, when the nail is started a sufficiently substantial distance from the plane of the abutting edge, it is quite difficult to prevent lateral displacement of the abutting member as the nail is driven angularly through the corner thereof and furthermore the corner oftentimes is not drawn up tightly against the side face of the other member.

The principal objects of my invention are to provide an improved toe-nailed connection of one member to another having greater strength than previous toe-nailed connections; to provide a simple and convenient fitting which insures accuracy and uniformity of toe-nailed connections and greater security; and to construct the fitting so it is readily adaptable for toe-nailing members together in different angular relations, these and other objects being accomplished as pointed out more particularly hereinafter and as disclosed in the accompanying drawing in which:

Fig. 1 is a front view, with portions broken away showing the two ends of a member or shelf toe-nailed to two upright members or end panels in accordance with my invention;

Fig. 2 is a fragmentary corner sectional view taken on the line 2—2 of Fig. 1;

Fig. 3 is a fragmentary sectional view taken on the line 3—3 of Fig. 2;

Fig. 4 is a view similar to Fig. 1 but showing a member toe-nailed endwise to end members at a different angle than in Fig. 1; and Fig. 5 is a side view of the fitting as constructed for making connections such as shown in Fig. 4.

Referring to the drawing, which it is to be understood are merely illustrative of several different applications of my invention, Fig. 1 shows a horizontal panel 11 secured endwise between a pair of vertical panels 12 in somewhat the manner of a shelf structure, the horizontal panel 11 being toe-nailed to the vertical panels 12 with toe-nailing fittings 13 in accordance with my invention.

Each fitting 13 is merely a short angular plate as shown particularly in Fig. 3, preferably of sheet metal, with an upright flange 14 of approximately the same width as the thickness of the panel or shelf 11 and a narrower flange 15 along the bottom which extends under the panel or shelf and serves as an under brace for the shelf corner and also facilitates placing the fitting in proper position for nailing to the panel or shelf.

Each upright flange 14 has a number of nail holes 16, preferably three, at intervals therealong and located substantially midway between the top and bottom of the flange 14, the nail holes being so distributed that there is a nail hole near each end substantially as shown in Fig. 1.

One of these fittings 13 is secured to the shelf or panel 11 at each corner thereof as illustrated, with the outer end of the fitting substantially flush with the end of the shelf or panel, by nails 17 driven through all of the nail holes 16 except the end one which is left open for toe-nailing, the nails 17 being driven while the bottom flange 15 of the fitting 13 is held tightly against the bottom of the shelf or panel 11 and the upright flange 14 being secured in this position tightly against the edge of the panel or shelf 11.

Thereafter, while the shelf or panel 11 is held in proper position between the vertical panels 12 the shelf is toe-nailed at each corner to the respective vertical panel 12 by driving a nail 18 through the outer end nail hole 16 of each fitting 13 and diagonally into the adjacent panel 12 as illustrated by the dotted lines representing the nails 18 in Fig. 2.

Thus each nail 18 is uniformly and accurately placed, does not engage through sufficient of the corner of the panel or shelf to be likely to split the wood, and has engagement throughout most of its length in the panel 12 so as to insure a very secure connection therewith.

Moreover, the nail 18 is sufficiently close to the end of the panel or shelf 11 to draw the edge portion of the vertical panel 12 tightly against the corner of the shelf or panel 11 and make a tight connection there and at the same time, the nail 18, being engaged through a hole 16 of the fitting 13, is firmly secured to the shelf or panel 11.

Thus an extremely secure and accurate toenailed connection of the shelf or panel 11 to the end uprights 12 is assured which is much stronger than the ordinary toe-nailed connection.

My invention may be employed in various toe-nailed connections other than in shelf like structures such as illustrated. In fact, my invention may be employed with any two members which are adapted for or fit together in a manner capable of toe-nailing together.

Preferably, however, when a member is to be toe-nailed to another member at an angle appreciably other than perpendicular, as for example as shown in Fig. 4, wherein the oblique member 19 is toe-nailed to the upright members 20, a special fitting such as shown at 21 and 22 in Fig. 4 is employed in which the upright flange thereof has an angular end 21a or 22a corresponding to the angularity of the member 20 to which it is to be toe-nailed and with the end nail-hole 23 thereof located the proper distance from the middle of the angular end.

Preferably the fitting 21 is made as shown in Fig. 5 with the upright flange 24 extended at one end beyond the bottom flange 25 as indicated at 26 in Fig. 5 and with the nail hole 27 at that end substantially in the plane of the end of the bottom flange as indicated in Fig. 5.

Thus by cutting off the extension 26 along the line 28 a fitting such as shown at 21 in Fig. 4 is provided which is nailed as at 29 to the oblique member 19 and toe-nailed at 30 to the upright member 20 at that end of the member 19.

By cutting off the extension 26 on the line 31, however, instead of on the line 28, this same fitting of Fig. 5 may be adapted for securing the other end of the oblique member 19 (when properly beveled at the end) to the other member 20.

The fitting 22 is the same as the fitting 21 except one is a right hand fitting and the other a left hand fitting, and the fitting 22 is made from a fitting like that shown in Fig. 5 except that it has the extension 26 at the opposite end thereof.

In other words, the fitting 22 is made from a fitting like that of Fig. 5 except that the bottom flange 25 is bent in the opposite direction from the upright flange 24.

While I have shown and described my invention in a preferred form, I am aware that various changes and modifications may be made without departing from the principles of my invention, the scope of which is to be determined by the appended claims.

What is claimed is:

1. An assembly of the class described comprising two elongated members, one of which extends crosswise of and is engaged sidewise against the end of the other member and has said other member abutting endwise against the side thereof, a metal plate secured to the side of said abutting member adjacent the juncture of the two members and lying in a plane which extends lengthwise of both members, and a fastener which is disposed obliquely to the longitudinal axis of the abutting member and extends obliquely through said metal plate and is embedded in said crosswise member, said metal plate having an end face approximately in the plane of the juncture of the two members.

2. An assembly of the class described comprising two elongated members, one of which extends crosswise of and is engaged sidewise against the end of the other member and has said other member abutting endwise against the side thereof, a metal plate secured to the side of said abutting member adjacent the juncture of the two members and lying in a plane which extends lengthwise of both members, and a fastener which is disposed obliquely to the longitudinal axis of the abutting member and substantially perpendicularly to the longitudinal axis of the crosswise member and extends obliquely through said metal plate and is embedded in said crosswise member, said metal plate having an end face approximately in the plane of the juncture of the two members.

3. An assembly of the class described comprising two elongated members, one of which extends crosswise of and is engaged sidewise against the end of the other member and has said other member abutting endwise against the side thereof, a metal plate secured to the side of said abutting member and terminating at the juncture of the two members and lying in a plane which extends lengthwise of both members, and a fastener which is disposed obliquely to the longitudinal axis of the abutting member and extends obliquely through said metal plate and is embedded in said crosswise member, said metal plate having an end face approximately in the plane of the juncture of the two members.

4. An assembly of the class described comprising two elongated members, one of which extends crosswise of and is engaged sidewise against the end of the other member and has said other member abutting endwise against the side thereof, a metal plate secured to the side of said abutting member adjacent the juncture of the two members and lying in a plane which extends lengthwise of both members, and a fastener which is disposed obliquely to the longitudinal axis of the abutting member and extends obliquely through said metal plate and is embedded in said crosswise member, said plate having a flange extending along one edge thereof and engaging against another side of the abutting member, said metal plate having an end face approximately in the plane of the juncture of the two members.

WILLIAM M. BUSHNELL.

REFERENCES CITED

The following references are of record in the file of this patent:

UNITED STATES PATENTS

| Number | Name | Date |
| --- | --- | --- |
| 254,965 | Hart | Mar. 14, 1882 |
| 949,075 | Hulett | Feb. 15, 1910 |
| 2,202,545 | Webb | May 28, 1940 |

FOREIGN PATENTS

| Number | Country | Date |
| --- | --- | --- |
| 522,698 | Germany | Mar. 26, 1931 |